April 8, 1958  M. L. GOEDKOOP  2,829,955
APPARATUS FOR CONTINUOUSLY CARRYING OUT REACTIONS
EMPLOYING SOLID SUBSTANCES
IN THE FLUIDIZED STATE
Filed April 13, 1954  6 Sheets-Sheet 1

United States Patent Office 2,829,955
Patented Apr. 8, 1958

2,829,955
APPARATUS FOR CONTINUOUSLY CARRYING OUT REACTIONS EMPLOYING SOLID SUBSTANCES IN THE FLUIDIZED STATE

Martinus Lambertus Goedkoop, Geleen, Netherlands, assignor to Stamicarbon N. V., Heerlen, Netherlands Application April 13, 1954, Serial No. 422,870

Claims priority, application Netherlands April 14, 1953

2 Claims. (Cl. 23—288)

The present invention relates to apparatus for continuously carrying out reactions employing solid substances in the fluidized state.

It has previously been proposed to continuously carry out reactions with solids in the fluidized state in apparatus in which the solid is fed into the top of the apparatus, subsequently traverses a number of superimposed reaction chambers and is then discharged from the bottom of each chamber. In each of the reaction chambers the solid is maintained in the fluidized state with the aid of a rising current of gas.

In my co-pending application, Serial No. 382,551, I have described apparatus which is distinguished from the abovementioned prior apparatus in that inter alia it is designed in such a way that the reaction chambers are disposed side by side and the fluidized solid traverses the chambers in series while the gas flows through the chambers in parallel.

It is found that for certain reactions this arrangement of apparatus wherein each reaction chamber is directly supplied with fresh gas during the reaction gives improved results.

In the apparatus as proposed in my aforesaid co-pending application, the reaction chambers are separated by their peripheral walls and the flow of solid from one chamber to the next takes place through apertures in the said walls by means of a difference in level of the fluidized solid in the successive chambers.

The present invention provides apparatus which is so designed that, while the gas flows through the reaction chambers in parallel and the solid flows through the chambers in series, as proposed in Serial No. 382,551, the flow of solid from one chamber to the next is not dependent on the preservation of a different fluidized solid level in the successive chambers.

In other words, according to the present invention, apparatus is provided for continuously carrying out reactions employing finely divided solid substances in the fluidized state, comprising two or more vertical reaction chambers in which the solid material may be maintained in the fluidized state by the passage of gas therethrough in parallel, the chambers being placed in series communication with each other by passage means which permit the solid material to be fed from one chamber to the next by the action of the fluidizing gas. Specifically, the passage means include a converging entrance portion or mouth within each reaction chamber so positioned that, in use, solid material in the chamber will continuously enter the mouth and be forced to pass through the passage means into the next chamber under the action of the fluidizing gas as this gas also rises into the mouth.

In carrying out certain reactions, e. g., temperature-sensitive exothermic reactions, proper reaction control by temperature regulation is important, as otherwise undesirably high temperatures are liable to occur. This is particularly the case with labile exothermic reactions in which none of the components is used up completely as, e. g., in the preparation of oxy-coal by reacting coal with oxygen, and in the synthesis of hydrocarbons from carbon monoxide and hydrogen.

For temperature control, the reaction chambers of apparatus according to the present invention may be positioned within a larger vessel and so spaced that a solid substance, serving as a heat transfer medium, may be maintained or circulated in the fluidized state about said chambers.

Alternatively, the reaction chambers, according to the invention, may be arranged as are the chambers of the apparatus described in my aforesaid co-pending application so that they are separated by their peripheral walls. By way of example, the chambers may be grouped together so that each chamber, or each of a majority of the chambers, lies immediately adjacent at least three other chambers. Thus, the chambers may be grouped together in the manner of the cells of a honeycomb and heat exchange from one chamber to another where desired may be promoted by making the side walls which divide off and peripherally bound the reaction chambers of good heat conducting material. With some reactions this is important for the control of the reaction temperature. Alternatively, cooling pipes or heating pipes, as the case may be, or other passages for a heat transferring medium may be arranged in the side walls of chambers grouped as aforesaid.

The invention is illustrated, but not limited, by the accompanying diagrammatic drawings wherein.

Figure 1:
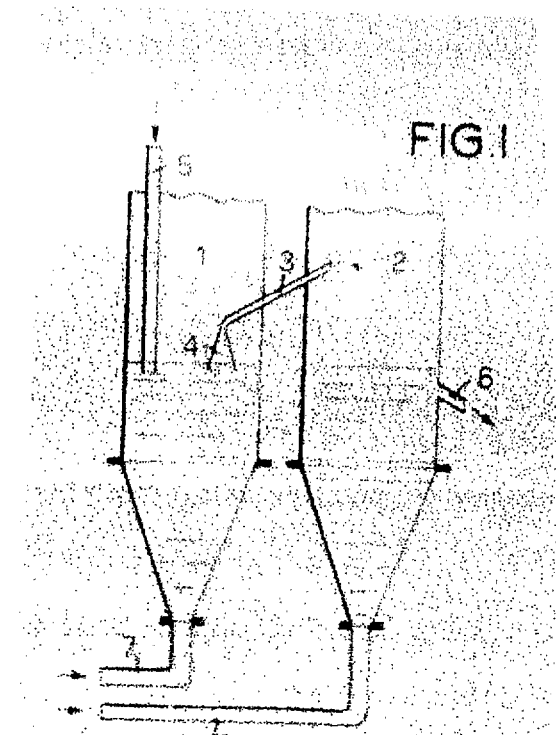
Figure 1 is a cross-sectional elevation of one form of apparatus according to the invention.

The form of apparatus shown in Figure 1 comprises two vertical and laterally juxtaposed reaction chambers 1 and 2 connected by the sloping conduit or lift pipe 3, the latter being provided with an inwardly converging inlet mouth 4.

When this apparatus is in operation, a finely divided solid material is supplied into reaction chamber 1 through conduit 5 and is discharged from reaction chamber 2 through conduit 6. In the reaction chambers 1 and 2, the solid material is kept in the fluidized state with the aid of rising currents of gas maintained by supplying gas through conduits 7 and 8. The gas supplied flows upwards in the reaction chambers and is discharged from the top (not shown) of each chamber.

The solid material continuously introduced through conduit 5 rises to a level above the lower edge of the mouthpiece 4 in the reaction chamber 1. The rising gas causes solid material to enter the mouthpiece and as the mouthpiece gradually narrows into the pipe 3, this solid material is caused to rise through the pipe 3 and thereby enter the reaction chamber 2.

As the transport of solid material from chamber 1 to chamber 2 is effected by the action of the rising gas, there is no need for a difference in the levels of the solid material in the reaction chambers 1 and 2. Accordingly, the amounts of finely divided solid substance and the gas velocities in the two reaction chambers may be equal.

The pipe 3 may be provided at a lower level than that shown in Figure 1. The part of the pipe in chamber 1 may be located entirely below the level of the solid substance in that chamber, and if desired, the pipe may be so placed that the discharge end of the pipe 3 opens into reaction chamber 2 below the level of the solid material in that chamber. In the latter case, it has been found that practically no solid material flows back into chamber 1.

Figure 2:
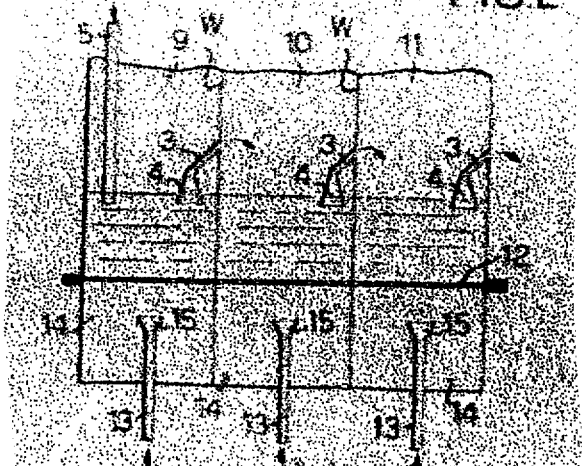
Figure 2 is also a cross-sectional elevation of another form of apparatus according to the invention.

In the apparatus according to Figure 2, the reaction chambers 9, 10, and 11 adjoin one another so as to be separated by their peripheral walls W. As shown, chambers 9, 10, and 11 are arranged on a common grid 12 and each chamber is provided with a pipe 3 communicating with the adjacent chamber. As in Figure 1, solid substance is supplied through conduit 5 and flows successively through the three reaction chambers. The fluidizing gas is introduced into the spaces 14 under grid 12 by means of the conduits 13. To promote a uniform distribution of the gas under the grid 12, the gas conduits 13 may be provided with appropriate distribution devices 15. Discharge of the gas from the reaction chambers occurs at the top of the apparatus (not shown).

In the apparatus of Figure 2, it will be observed that the pipes 3, while leading through the walls W between adjoining reaction chambers, do not project beyond these walls. This construction offers the advantage that no solid substance can deposit on the discharge end portions of the pipes where it might rest in quiescent condition.

Figure 3:
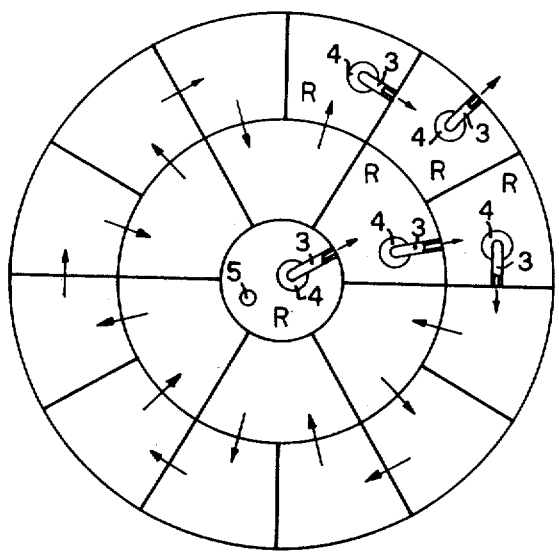
Figure 3 is a sectional plan view of another, larger apparatus.

The apparatus shown in Figure 3 comprises a plurality of reaction chambers (several of which are designated as R) connected in series in the manner shown in Figure 2. However, in the arrangement of Figure 3, the reaction chambers are grouped together like the cells of a honeycomb to form a cylindrical structure. In this case, the solid substance is introduced into the central reaction chamber R through the feed conduit 5 and subsequently traverses the other reaction chambers in the order indicated by the arrows. Only a few of the communicating pipes 3, with their converging mouthpieces 4, are shown for the sake of simplicity.

With the apparatus of Figure 3, the temperature in the reaction chambers may be regulated in a simple manner. Specifically, heat transfer may take place through the walls separating the reaction chambers and may be influenced by the order in which the reaction chambers are traversed by the solid substance. In general, any desired temperature regulation is possible if heat-transfer means are provided in the walls between the reaction chambers. Accordingly, with such an arrangement, it is not, in most cases, necessary to provide further temperature regulating mechanisms in the reaction chambers.

Figure 4:
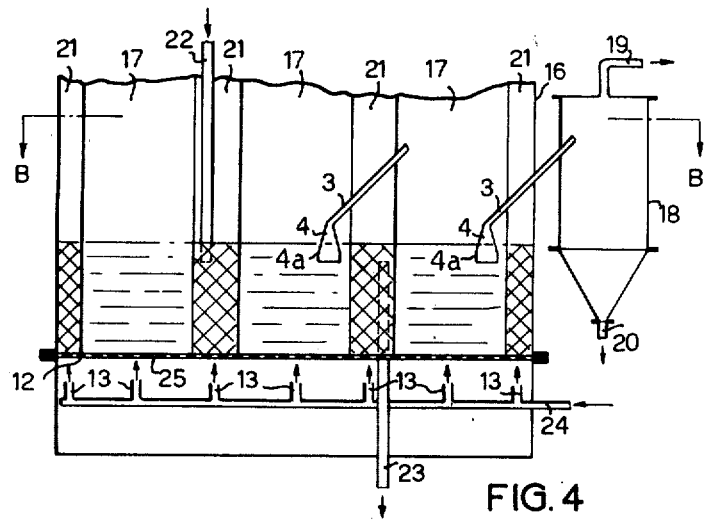
Figure 4 is a sectional elevation of still another modification taken on the line AA of Figure 5.
Figure 5:
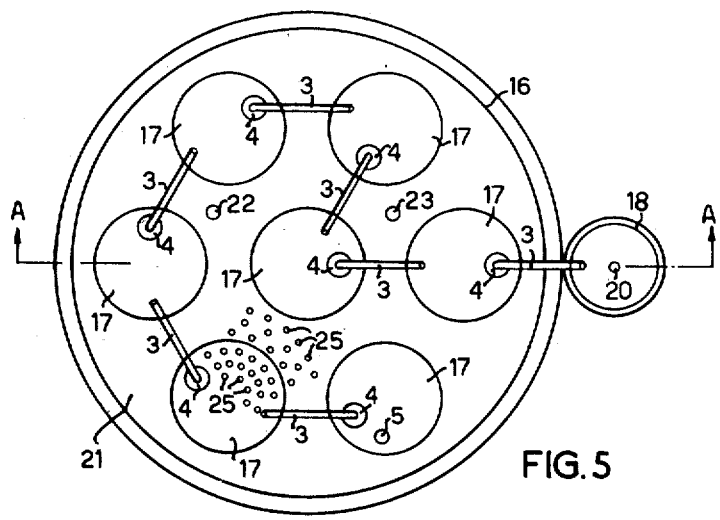
Figure 5 is a sectional plan view on the line BB of Figure 4.

An alternative construction comprising a plurality of reaction chambers is shown in Figures 4 and 5.

In the apparatus of these figures, a grid 12 is provided across cylinder 16, and on the grid are fastened a number of cylindrical reaction vessels 17. These vessels are connected in series by means of the pipes 3, each of which has a converging entrance mouthpiece 4, so that solid substance supplied through feed conduit 5 (Figure 5) traverses in sequence all the reaction chambers 17 and is then caught in the separating vessel 18, which has a gas outlet 19 and an outlet 20 for the solid substance.

The reaction chambers 17 are so arranged on the grid 12 that they are surrounded by the space 21 in the cylinder 16. Solid substance may be introduced into this space 21 through conduit 22, and removed through conduit 23.

In the reaction chambers 17, and in the surrounding space 21, the solid substance is kept in the fluidized state with the help of gas which is supplied from a common gas conduit 24, first through the pipes 13, and then upwardly through the openings 25 of grid 12. At the top of the apparatus (not shown in the drawing) the gas from the reaction chambers 17 and the gas issuing from the surrounding space 21 are discharged separately.

Regulation of the temperature in the apparatus according to Figures 4 and 5 may be carried out with the help of a solid substance maintained in the fluidized state in the space surrounding the reaction chambers. In such case, this solid substance may be passed through the surrounding space 21 in a continuous stream and thus be used for the heat transfer. It is also possible to keep a given amount of solid substance in space 21 in the fluidized state. In this way, no solid substance is discharged from space 21, heat transfer being effected by the gas which is used in the free space to maintain such fluidized state.

When using the apparatus of Figures 4 and 5, it is preferred to employ in the space surrounding the reaction chambers a solid substance which requires about the same gas velocity for maintaining the fluidized state as the gas velocity used in the reaction chambers. Thus, for example, if a catalyst on a carrier is employed in the reaction chambers, the carrier may be used alone in the surrounding space. Similarly, if the carbonization of coal or the preparation of oxy-coal is carried out in the reaction chambers, coke in the fluidized state may be used in the surrounding space.

It is also possible to carry out two reactions at the same time in the embodiment of the apparatus shown in Figures 4 and 5. For example, an endothermic reaction, such as the cracking of hydrocarbons, can be effected in the reaction chambers, while an exothermic reaction, such as the regeneration of the catalyst, is taking place in the space surrounding the reaction chambers. In this event, separate gas feeds and gas discharges for the two reactions must be used.

The space surrounding the reaction chambers may also be utilized for pre-heating the solid substance. In this case, the solid substance should first traverse the said space 21 and thereafter be introduced into the first reaction chamber, preferably with the help of a pipe as employed for the conveyance of the solid between the reaction chambers. Alternatively, the gas used in fluidization may be pre-heated in this manner.

The form of the pipes 3 may be varied, e. g., they may be straight or bent provided they have a converging inlet or mouthpiece portion which causes the solid material to be transported from one chamber to the next by the action of the rising gas.

It is found that little, if any, of the solid substance passing into the pipes 3, flows back into the chamber from which it has come. Moreover, any tendency for such flowback to occur may be counteracted by providing the wider end of each mouthpiece 4 with a short cylindrical section 4a as shown in Figure 4. These sections can be, for example, 1 to 2 cms. in length although longer or shorter sections may also be satisfactorily used.

The diameter of the pipes 3 may also be widely varied but it is preferred that the proportion of the pipe diameter to the wider end diameter of the appertaining mouthpiece be about 1:3. If desired, two or more jet pipes operating in parallel and having diameters of the order of, for example, from 1 to 5 cms. may be used to join the reaction chambers in lieu of a single pipe of substantially larger diameter.

The present apparatus is suitable for use in carrying out a wide variety of reactions involving finely divided substances in the fluidized state. As typical illustrations, there may be mentioned the catalytic reaction of gases, in which a catalyst in the fluidized state is employed such as cracking, dehydrogenation, hydrogenation, aromatization and alkylation of hydrocarbons, and the synthesis of hydrocarbons by reaction of carbon monoxide and hydrogen.

Further examples include procedures in which the solid substance also takes part in the reaction, such as the regeneration of catalysts, the oxidation of methane or other hydrocarbons with the help of metal oxides, the roasting of ores, the preparation of calcium oxide by heating calcium carbonate, the desulphuration of gases, the preparation of phenols by reacting steam with a fine-grained mixture of salts of benzene sulphonic acids and alkali or alkaline earth hydroxides, the preparation of oxycoal by reacting coal with oxygen, the carbonization of coal, and the preparation of gas mixtures from coal or coke by reaction with oxygen and steam.

As a further feature of the invention, means are provided for separating fluidizing gas from the fluidized finely divided solid substance withdrawn through the pipe or pipes 3 so that the substance as discharged into the next reaction chamber is substantially free of gas. In this way, the solid particles do not need to settle out of a gas phase after they enter the reaction chamber. Additionally, such gas-solids separation makes it possible to keep the fluidizing gases in the various reaction chambers completely separated from each other. This is accomplished by so constructing the separating means that solids therein are discharged into one reaction chamber and the separated gas is discharged outside that chamber, e. g., into the chamber from which the solids were withdrawn.

Broadly stated, the desired gas-solids separation is effected by modifying the apparatus described above to include gas and solids separating means into which each pipe or passage means 3 discharges solid substance withdrawn from the chamber from which the passage means leads.

It is preferred that the separating means comprise a separating chamber having a gas outlet at the top and a solids discharge at the bottom. Thus, any separating means in which solid particles can be separated from a gas by virtue of their weight is satisfactory. Accordingly, conventional separating devices such as dust collectors or cyclones can be utilized.

The separating means may be associated with the passage means either within the reaction chamber from which the solid substance is withdrawn by the passage means or within the reaction chamber into which the substance is discharged. As a further alternative, these separating means may be located between a pair of reaction chambers. In the latter event, the passage means 3 should be extended outwardly through one of the reaction chambers for connection with, i. e., discharge into, the separating means while the solids outlet of the separating means is arranged to discharge into the second reaction chamber. The gas outlet may, if desired, be arranged to discharge into the first reaction chamber.

In the case where the separating means is positioned within the chamber into which the solid substance is discharged, passage means 3 is extended outwardly from the chamber from which the solids are withdrawn into the other chamber for connection with the separating means. With such modification, the gas outlet from the separating means may also be led back to the first reaction chamber for the purpose of returning the gas thereto.

Preferably, the passage means (or pipe 3 and associated mouthpiece 4) and associated separating means are both positioned in the reaction chamber from which solids are withdrawn by these elements with the solids outlet of the separating means arranged to discharge solids into the next reaction chamber and the gas outlet discharging into the reaction chamber from which the solids are withdrawn. This modification is the most desirable because it is necessary to have only one conduit passed through the walls of each reaction chamber. Additionally, as mentioned above, this embodiment avoids mixing of the fluidizing gases between various chambers. Accordingly, it is especially suited for carrying out catalytic reactions with regeneration of the catalyst. Thus, using a plurality of reaction chambers connected up in series, a continuous flow of catalyst may alternately be contacted with reaction gases and regeneration gases in successive reaction chambers.

Figure 6:
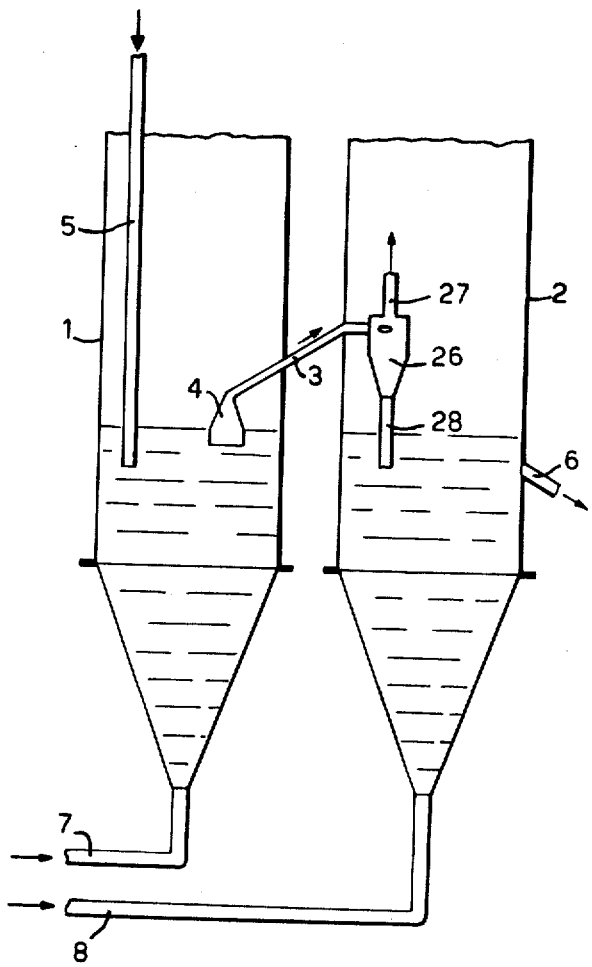
Figures 6–8 are cross-sectional elevation views of further modifications of the invention.
Figure 7:
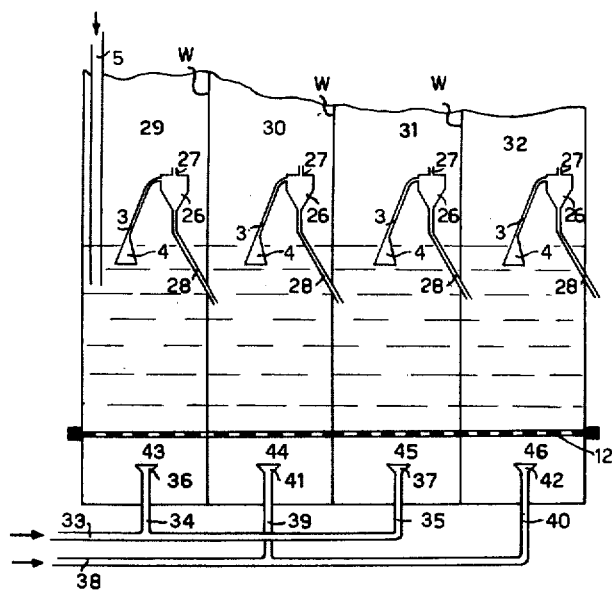
Figure 8:
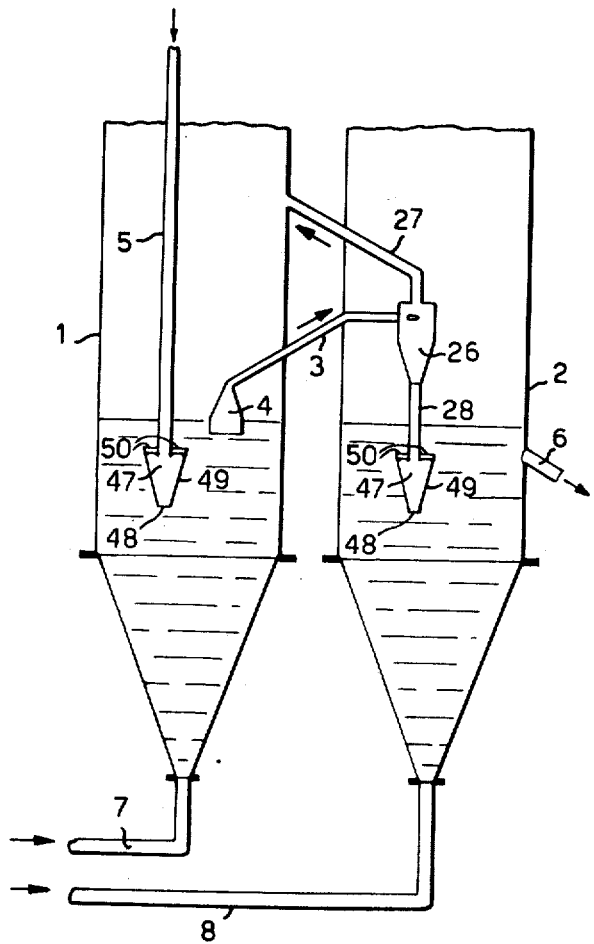

The gas-solids separating feature referred to above is further illustrated by Figures 6 to 8. The apparatus of Figure 6 is generally similar to that of Figure 1 with like numerals representing like parts. However, in the embodiment shown in Figure 6, pipe 3 discharges into a separating chamber 26 positioned within reaction chamber 2 and having a gas outlet 27 and a solids outlet 28, both of which open into reaction chamber 2.

Figure 7 illustrates a preferred modification wherein the passage means and associated separating means 26 are both positioned within the reaction chamber from which solids are withdrawn. In this particular arrangement, reaction chambers 29, 30, 31, and 32 are positioned adjacent each other. Reaction chambers 29 and 31 are supplied with fluidizing gas through the main conduit 33, branch conduits 34 and 35, and distributors 36 and 37. Reaction chambers 30 and 32 are supplied with fluidizing gas through conduit 38, branch conduits 39 and 40, and distributors 41 and 42. As in Figure 2, the fluidized solid substance in each reaction chamber is positioned over grid 12 through which the fluidizing gases rise from gas headers 43, 44, 45, and 46. As shown, each reaction chamber includes a pipe 3 with mouthpiece 4 associated with separating chamber 26, the latter having a gas outlet 27 adapted to discharge gas back into the reaction chamber from which it comes and a solids outlet 28 for discharging solids into the next reaction chamber.

The apparatus of Figure 8 is similar to that of Figure 6 except that in Figure 8 the gas outlet 27 leads back into reaction vessel 1 rather than discharging into vessel 2. In this way, and in contrast to the apparatus of Figure 6, mixing of the fluidizing gases fed into chambers 1 and 2 through conduits 7 and 8, respectively, can be avoided.

Figure 8 also shows novel means for discharging the solid substance from conduit 5 and solids outlet 28 so as to insure an unhindered supply of the solid substance as described in Dutch patent application Ser. No. 185,756. Specifically, the lower ends of conduit 5 and outlet 28 empty into the open, wider top portion of a downwardly tapered header 47 having a discharge opening 48 at the bottom. The side wall 49 of header 47 is suitably fixed to conduit 5 and outlet 28 by means of suitable rods 50.

Apparatus as shown in Figure 3 wherein reaction chambers with transverse grids, are disposed side by side, separated by their peripheral walls, and with each chamber lying immediately adjacent at least two other chambers, forms the subject of and is claimed in my aforesaid co-pending application Ser. No. 382,551.

Having described my invention, what I intend to claim as new is:

1. Apparatus for continuously carrying out reactions employing finely divided solid substances in the fluidized state comprising a plurality of separate laterally disposed reaction chambers wherein the finely divided solid substance is maintained in the fluidized state, means for passing fluidizing gas upwardly in parallel through each of said chambers, means for discharging the fluidizing gas from each chamber at a point above the level of the fluidized substance therein, and passage means for withdrawing solid substance from one chamber and discharging same into another chamber whereby said solid substance may be passed through said chambers in series solely under the action of said fluidizing gas, said passage means comprising a downwardly facing solids inlet end positioned below the level of the fluidized solid within the chamber from which the fluidized solid substance is to be withdrawn and converging upwardly into a conduit which leads through the space above said level of the fluidized solid and which communicates with the chamber into which the fluidized solid substance is to be discharged.

2. Apparatus according to claim 1 in which the said conduit which leads through the space above the level of the fluidized solids debouches into means for separating gas and solids, the solid outlet of said means communicating with the chamber into which the solid substance is to be discharged.

References Cited in the file of this patent

UNITED STATES PATENTS

| 2,446,925 | Hemminger | Aug. 10, 1948 |
| 2,464,812 | Johnson | Mar. 22, 1949 |
| 2,490,986 | Symonds | Dec. 13, 1949 |
| 2,529,366 | Bauer | Nov. 7, 1950 |
| 2,650,155 | Medlin | Aug. 25, 1953 |
| 2,723,838 | Peters | Nov. 15, 1955 |

FOREIGN PATENTS

| 290,580 | Switzerland | May 13, 1953 |